United States Patent [19]

Sommerfeld et al.

[11] 4,331,778
[45] May 25, 1982

[54] PROCESS FOR THE PRODUCTION OF POLYURETHANE PLASTICS

[75] Inventors: Claus-Dieter Sommerfeld, Cologne; Peter Haas, Haan; Kuno Wagner, Leverkusen; Manfred Kapps, Bergisch-Gladbach, all of Fed. Rep. of Germany

[73] Assignee: Bayer Aktiengesellschaft, Leverkusen, Fed. Rep. of Germany

[21] Appl. No.: 102,162

[22] Filed: Dec. 10, 1979

[30] Foreign Application Priority Data

Dec. 16, 1978 [DE] Fed. Rep. of Germany ....... 2854384

[51] Int. Cl.³ .................... C08G 18/14; C08G 18/18
[52] U.S. Cl. .................... 521/129; 528/53; 564/508; 564/511; 564/512
[58] Field of Search .................... 521/129; 528/53

[56] References Cited

U.S. PATENT DOCUMENTS

| 3,036,020 | 5/1962 | Britain | 260/2.5 |
| 3,239,480 | 3/1966 | Windemuth et al. | 260/31.2 |
| 3,330,782 | 7/1967 | Poppelsdorf | 260/2.5 |
| 3,400,157 | 9/1968 | Poppelsdorf | 521/129 |
| 3,476,933 | 11/1969 | Mendelsohn | 521/129 |
| 3,816,339 | 6/1974 | Raden | 521/129 |
| 4,012,445 | 3/1977 | Priest et al. | 260/561 A |
| 4,016,113 | 4/1977 | Preston et al. | 521/129 |
| 4,048,107 | 9/1977 | Babiec et al. | 521/129 |
| 4,080,343 | 3/1978 | Raden | 521/129 |
| 4,143,003 | 3/1979 | Haas et al. | 521/129 |
| 4,248,930 | 2/1981 | Haas et al. | 428/315 |

FOREIGN PATENT DOCUMENTS

| 1237777 | 3/1967 | Fed. Rep. of Germany | 521/129 |
| 908337 | 10/1962 | United Kingdom . | |
| 1339931 | 12/1973 | United Kingdom . | |
| 1530225 | 10/1978 | United Kingdom . | |
| 1530226 | 10/1978 | United Kingdom . | |

OTHER PUBLICATIONS

Union Carbide Bulletin, "Niax Catalyst A-1", U.C.Co., New York, Sep. 1967, 11 pages.
Bayer, Angewandte Chemie, A59 (1947), pp. 257-272.
Saunders et al., Polyurethanes, Part II, Interscience, (N.Y.), 1964, pp. 45-47.

Primary Examiner—H. S. Cockeram
Attorney, Agent, or Firm—Gene Harsh; Joseph C. Gil; Lyndanne M. Whalen

[57] ABSTRACT

The present invention relates to a process for the production of polyurethane plastics by reacting compounds containing at least two isocyanate-reactive hydrogen atoms and having a molecular weight in the range of from 400 to 10,000, polyisocyanates and, optionally, chain extenders having a molecular weight of from 32 to 400, foam stabilizers, water and/or organic blowing agents in the presence of catalysts containing tertiary nitrogen. These catalysts are characterized in that mixtures of (a) one or more cross-linking catalysts corresponding to the following general formula:

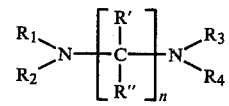

wherein
$R_1$, $R_2$, $R_3$ and $R_4$ which may be the same or different, represent $C_1$–$C_5$-alkyl radicals, preferably $CH_3$— or $C_2H_5$ radicals,
$R'$ and $R''$ represent hydrogen or the same or different $C_1$–$C_3$-alkyl radicals, preferably $CH_3$— or $C_2H_5$— radicals, and
n represents an integer of from 1 to 10, preferably from 4 to 8, (b) blowing catalysts corresponding to the following general formula:

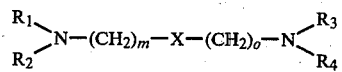

wherein
$R_1$, $R_2$, $R_3$ and $R_4$, are as defined above and
X represents oxygen or

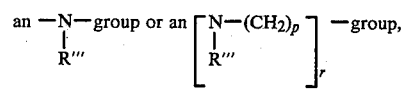

where $R'''$ represents a $C_1$–$C_5$ alkyl radical, preferably a $CH_3$— or $C_2H_5$— radical,
p represents an integer of from 2 to 4 and
r represents an integer of from 1 to 3, and
m and o which may be the same or different, represent numbers ranging from 1 to 10, preferably from 1 to 3 in value.

13 Claims, No Drawings

PROCESS FOR THE PRODUCTION OF POLYURETHANE PLASTICS

BACKGROUND OF THE INVENTION

Polyurethane foams with a wide variety of physical properties have long been manufactured on a commercial scale by the known isocyanate polyaddition process from compounds containing several active hydrogen atoms, in particular compounds containing hydroxyl and/or carboxyl groups, and polyisocyanates with the addition of water and/or blowing agents and optionally catalysts, emulsifiers and other additives (Angew. Chem. A. 59 (1947), page 257). Given a suitable choice of components, either flexible or rigid foams or any products between these extremes may be obtained.

Polyurethane foams are preferably produced from liquid starting components, either by mixing all the starting materials together in a one-shot process or by first preparing a prepolymer containing isocyanate groups from a polyol and an excess of polyisocyanate and then foaming this prepolymer, e.g., with reaction with water.

Tertiary amines have become well established as catalysts in the production of polyurethane foams. They accelerate the reaction of hydroxyl and carboxyl groups with isocyanate groups (urethane reaction) and the reaction between water and isocyanates (blowing reaction). The velocities of the two reactions which take place simultaneously in the one-shot process have to be adjusted relative to each other. Cross-linking reactions which give rise to the formation of allophanate, biuret and cyanurate structures take place during the foaming process in addition to the reactions mentioned above.

In view of the large number of reactions taking place, the catalyst must be chosen so that it insures synchronous adjustment of the reactions to each other. At the same time, the catalyst must not be fixed too early in the process by incorporation in the foam, nor must it subsequently accelerate hydrolytic degradation of the foam product. This problem has not up to now been completely solved.

There are a number of known catalysts for the production of polyurethane plastics. Tertiary amines suitable as cross-linking catalysts are described for example in U.S. Pat. Nos. 3,036,020 and 3,239,480. Additionally, tertiary amines may be used as blowing catalysts. Examples of such amines include those described in U.S. Pat. No. 4,143,003, and U.S. application Ser. No. 920,563 filed June 29, 1978. However, these catalysts by themselves have not completely answered all of the problems associated with polyurethane plastic production. German Offenlegungsschrift No. 2,624,528 indicates that catalysts of the general formula:

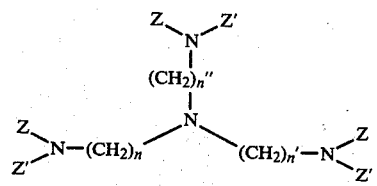

may be combined with N,N,N',N'-tetramethyl ethylene diamine, pentamethyl diethylene triamine or N,N,N',N'-tetramethyl-1,3-butane diamine.

It has surprisingly been found that the property spectrum of polyurethane plastics can be adjusted with the catalyst combination used in accordance with the present invention in such a way that:

1. A very short in-mold time,
2. Minimal brittleness,
3. Good adhesion to surface layers, such as phosphatized and lacquered sheet metal, melamine resins, ABS and, in particular, polystyrene,
4. Substantial freedom from odor,
5. Outstanding fluidity,
6. A low gross density can be simultaneously obtained.

DESCRIPTION OF THE INVENTION

The present invention relates to a process for the production of polyurethane plastics by reacting compounds containing at least two isocyanate-reactive hydrogen atoms and having a molecular weight in the range of from 400 to 10,000, polyisocyanates and, optionally, chain extenders having a molecular weight of from 32 to 400, foam stabilizers, water and/or organic blowing agents in the presence of catalysts containing tertiary nitrogen. These catalysts are characterized in that mixtures of (a) one or more cross-linking catalysts corresponding to the following general formula:

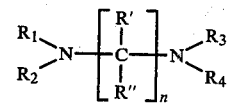

wherein $R_1$, $R_2$, $R_3$ and $R_4$ which may be the same or different, represent $C_1$–$C_5$-alkyl radicals, preferably $CH_3$— or $C_2H_5$ radicals, $R'$ and $R''$ represent hydrogen or the same or different $C_1$–$C_3$-alkyl radicals, preferably $CH_3$— or $C_2H_5$— radicals, and n represents an integer of from 1 to 10, preferably from 4 to 8, with (b) one or more blowing catalysts corresponding to the following general formula:

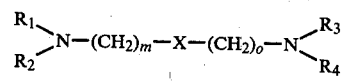

wherein $R_1$, $R_2$, $R_3$, and $R_4$, are as defined above, and

X represents oxygen or

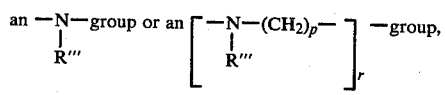

wherein $R'''$ represents a $C_1$–$C_5$ alkyl radical, preferably a $CH_3$— or $C_2H_5$— radical, p represents an integer of from 2 to 4 and r represents an integer of from 1 to 3, and m and o which may be the same or different, represent numbers ranging from 1 to 10, preferably from 1 to 3 in value.

According to the present invention, it is preferred to use combinations of from 0.1 to 3.0 parts by weight, most preferably from 0.3 to 1.0 parts by weight, of the blowing catalysts with from 0.3 to 5.0 parts by weight, most preferably from 1.0 to 3.0 parts by weight of the cross-linking catalysts per 100 parts by weight of the compound containing at least two active hydrogen atoms and having a molecular weight in the range of from 400 to 10,000.

The cross-linking and blowing reaction may be specifically regulated by suitably selecting the combination of catalysts according to the present invention.

In addition, the specific catalysis of cross-linking and blowing reactions which is possible in accordance with the present invention enables the water content of recipes of the type in question to be reduced by from 10 to 30%, which distinctly improves the coefficient of thermal conductivity of the foam.

The following materials are used as starting materials for carrying out the process according to the present invention: aliphatic, cycloaliphatic, araliphatic, aromatic and heterocyclic polyisocyanates of the type described, for example, by W. Siefken in Justus Liebigs Annalen der Chemie, 562, pages 75 to 136, an example being those corresponding to the following general formula:

$$Q(NCO)_n$$

wherein
n=2–4, preferably 2, and
Q represents an aliphatic hydrocarbon radical containing from 2 to 18 carbon atoms, preferably from 6 to 10 carbon atoms, a cycloaliphatic hydrocarbon radical containing from 4 to 15, preferably from 5 to 10 carbon atoms, an aromatic hydrocarbon radical containing from 6 to 15 carbon atoms, preferably from 6 to 13 carbon atoms, or an araliphatic hydrocarbon radical containing from 8 to 15 carbon atoms, preferably from 8 to 13 carbon atoms. Specific examples of these types of compounds are: ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers, 1-isocyanato-3,3,5-trimethyl-5-isocyanatomethyl cyclohexane (German Auslegeschrift No. 1,202,785 and U.S. Pat. No. 3,401,190), 2,4- and 2,6-hexahydrotolylene diisocyanate and mixtures of these isomers, hexahydro-1,3- and/or -1,4-phenylene diisocyanate, perhydro-2,4'- and/or -4,4'-diphenyl methane diisocyanate, 1,3- and 1,4-phenylene diisocyanate, 2,4- and 2,6-tolylene diisocyanate and mixtures of these isomers, diphenyl methane-2,4'- and/or -4,4'-diisocyanate, and naphthalene-1,5-diisocyanate.

In the present inventions, it is also possible, for example, to use triphenyl methane-4,4',4''-triisocyanate, polyphenyl polymethylene polyisocyanates of the type obtained by condensing aniline with formaldehyde, followed by phosgenation, and described, for example, in British Pat. Nos. 874,430 and 848,671. Also suitable for the present invention are m- and p-isocyanatophenyl sulfonyl isocyanates according to U.S. Pat. No. 3,454,606, perchlorinated aryl polyisocyanates of the type described, for example, in German Auslegeschrift No. 1,157,601 (U.S. Pat. No. 3,277,138), polyisocyanates containing carbodiimide groups of the type described in German Pat. No. 1,092,007 (U.S. Pat. No. 3,152,162) and in German Offenlegungsschriften Nos. 2,504,400, 2,537,685 and 2,552,350. Further suitable isocyanates are the norbornane diisocyanates according to U.S. Pat. No. 3,492,330 and polyisocyanates containing allophanate groups of the type described, for example, in British Pat. No. 994,890, in Belgian Pat. No. 761,626 and in Dutch Patent Application No. 7,102,524. Additional suitable polyisocyanates containing isocyanurate groups of the type described are for example, in U.S. Pat. No. 3,001,973, German Pat. Nos. 1,022,789, 1,222,067 and 1,027,394 and in German Offenlegungsschriften Nos. 1,929,034 and 2,004,048, polyisocyanates containing urethane groups of the type described, for example, in Belgian Pat. No. 752,261 or in U.S. Pat. Nos. 3,394,164 and 3,644,457. Polyisocyanates containing acylated urea groups according to German Pat. No. 1,230,778 and polyisocyanates containing biuret groups of the type described, for example in U.S. Pat. Nos. 3,124,605, 3,201,372, and 3,124,605 and in British Pat. No. 889,050 are also suitable for use in the instant invention. Polyisocyanates produced by telomerization reactions of the type described, for example in U.S. Pat. No. 3,654,106, and polyisocyanates containing ester groups of the type described, for example, in British Pat. Nos. 965,474 and 1,072,956, in U.S. Pat. No. 3,567,763 and in German Pat. No. 1,231,688 and also reaction products of the above-mentioned isocyanates with acetals according to German Pat. No. 1,072,385 and polyisocyanates containing polymeric fatty acid esters according to U.S. Pat. No. 3,455,883 are further suitable compounds for use in the instant invention.

It is also possible to use the isocyanate-group-containing distillation residues obtained in the commercial production of isocyanates, optionally in solution in one or more of the above-mentioned polyisocyanates. It is also possible to use any mixture of the above-mentioned polyisocyanates.

Preferred polyisocyanates are aromatic polyisocyanates.

In general, it is particularly preferred to use the commercially readily available polyisocyanates, for example, 2,4- and 2,6-tolylene diisocyanate, also any mixtures of these isomers ("TDI"), polyphenyl polymethylene polyisocyanates of the type obtained by condensing aniline with formaldehyde, followed by phosgenation ("crude MDI") and polyisocyanates containing carbodiimide groups, urethane groups, allophanate groups, isocyanurate groups, urea groups or biuret groups ("modified polyisocyanates"), particularly modified polyisocyanates of the type derived from 2,4- and/or 2,6-tolylene diisocyanate or from 4,4'- and/or 2,4'-diphenyl methane diisocyanate.

Additional starting components include compounds containing at least 2 isocyanate-reactive hydrogen atoms and having a molecular weight of generally from 400 to 10,000. In addition to compounds containing amino groups, thiol groups or carboxyl groups, preferred compounds are compounds containing hydroxyl groups, particularly compounds containing from 2 to 8 hydroxyl groups and, above all, compounds having a molecular weight of from 1000 to 6000, preferably from 2000 to 4000, for example, polyesters, polyethers, polythioethers, polyacetals, polycarbonates and polyester amides containing at least 2, generally from 2 to 8, but preferably from 2 to 4 hydroxyl groups, of the type known per se for the production of homogeneous and cellular polyurethanes.

The polyesters containing hydroxyl groups suitable for use in accordance with the present invention are, for example, reaction products of polyhydric, preferably dihydric and, optionally, trihydric alcohols with polybasic, preferably dibasic, carboxylic acids. Instead of using the free polycarboxylic acids, it is also possible to use the corresponding polycarboxylic acid anhydrides or corresponding polycarboxylic acid ester or lower alcohols or mixtures thereof for producing the polyesters. The polycarboxylic acids may be aliphatic, cycloaliphatic, aromatic and/or heterocyclic and may optionally be substituted, for example by halogen atoms, and/or unsaturated.

Examples of suitable carboxylic acids as well as their derivatives are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid anhydride, fumaric acid, dimerized and trimerized unsaturated fatty acids, optionally in admixture with monomeric unsaturated fatty acids such as oleic acid, terephthalic acid dimethyl ester and terephthalic acid-bis-glycol ester. Suitable polyhydric alcohols are, for example, ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, 1,2,4-butane triol, trimethylol ethane, pentaerythritol, quinitol, mannitol, sorbitol, formitol, methyl glycoside, also diethylene glycol, triethylene glycol, tetraethylene glycol and higher polyethylene glycols, dipropylene glycol and higher polypropylene glycols, dibutylene glycol and higher polybutylene glycols. The polyesters may contain terminal carboxyl groups. Polyesters of lactones, for example $\epsilon$-caprolactone, or of hydroxy carboxylic acids for example $\omega$-hydroxy caproic acid, may also be used.

The polyethers containing at least 2, generally from 2 to 8 and preferably 2 or 3 hydroxyl groups suitable for use in accordance with the present invention are also known per se and are obtained, for example, by polymerizing epoxides, such as ethylene oxide, propylene oxide, butylene oxide, tetrahydrofuran, styrene oxide or epichlorohydrin on their own, for example in the presence of Lewis catalysts, such as $BF_3$, or by the addition of these epoxides, preferably ethylene oxide and propylene oxide, optionally in admixture or successively, with a starter component containing reactive hydrogen atoms, such as water, alcohols, ammonia or amines, for example, ethylene glycol, 1,3-propylene glycol or 1,2-propylene glycol, trimethylol propane, glycerol, sorbitol, 4,4'-dihydroxy diphenyl propane, aniline, ethanolamine or ethylene diamine. Sucrose polyethers of the type described, for example in German Auslegeschriften Nos. 1,176,358 and 1,064,938 and formitol- or formose-started polyethers (German Offenlegungsschriften Nos. 2,639,083 and 2,737,951) may also be used in accordance with the present invention. In many cases, it is preferred to use polyethers which predominantly contain secondary or primary OH-groups or mixtures thereof (up to 90% by weight, based on all the OH-groups present in the polyether). Polybutadienes containing OH-groups are also suitable for use in accordance with the present invention.

Among the polythioethers, reference is made in particular to the condensation products of thiodiglycol on its own and/or with other glycols, dicarboxylic acids formaldehyde, aminocarboxylic acids or amino alcohols. Depending on the co-components, the products in question are, for example, polythio mixed ethers, polythioether esters or polythioether ester amides.

Suitable polyacetals are, for example, the compounds obtainable from glycols, such as diethylene glycol, triethylene glycol, 4,4'-dioxyethoxy diphenyl dimethyl methane, hexane diol and formaldehyde. Polyacetals suitable for use in accordance with the present invention may also be obtained by polymerizing cyclic acetals such as trioxane (German Offenlegungsschrift No. 1,694,128).

Suitable polycarbonates containing hydroxyl groups are known per se and can be obtained, for example, by reacting diols, such as 1,3-propane diol, 1,4-butane diol and/or 1,6-hexane diol, diethyl glycol, tetraethylene glycol or thiodiglycol, with diaryl carbonates, for example, diphenyl carbonate, or phosgene (German Auslegeschriften Nos. 1,694,080, 1,915,908 and 2,221,751; German Offenlegungsschrift No. 2,605,024).

The polyester amides and polyamides include, for example, the predominantly linear condensates obtained for example, from polybasic saturated or unsaturated carboxylic acids or their anhydrides and polyhydric saturated or unsaturated amino alcohols, diamines, polyamines and mixtures thereof.

Polyhydroxyl compounds already containing urethane or urea groups and optionally modified natural polyols, such as castor oil or carbohydrates, for example starch, may also be used. Addition products of alkylene oxides with phenol/formaldehyde resins or even with urea/formaldehyde resins may also be used in accordance with the present invention.

Before they are used in the polyisocyanate-polyaddition process, the above-mentioned polyhydroxyl compounds may be modified in various ways. Thus, according to German Offenlegungsschriften Nos. 2,210,839 (U.S. Pat. Nos. 3,849,515) and 2,544,195, a mixture of different polyhydroxyl compounds (for example, a polyether polyol and a polyester polyol) may be condensed by etherification in the presence of a strong acid to form a relatively high molecular weight polyol which is made up of different segments attached through ether bridges. It is also possible, for example in accordance with German Offenlegungsschrift No. 2,559,372 to introduce amide groups into the polyhydroxyl compounds or, in accordance with German Offenlegungsschrift No. 2,620,487 to introduce triazine groups by reaction with polyfunctional cyanic acid esters. The reaction of a polyol with a less than equivalent quantity of a diisocyanatocarbodiimide, followed by reaction of the carbodiimide group with an amine amide, phosphite or carboxylic acid gives polyhydroxyl compounds containing guanidine, phosphonoformamidine or acyl urea groups (German Offenlegungsschriften Nos. 2,714,289, 2,714,292 and 2,714,293). In some cases, it is particularly advantageous to completely or partly convert the relatively high molecular weight polyhydroxyl compounds into the corresponding anthranilic acid esters by reaction with isatoic acid anhydride, as described in German Offenlegungsschriften Nos. 2,019,432 and 2,619,840 and in U.S. Pat. Nos. 3,808,250, 3,975,428 and 4,016,143. Relatively high molecular weight compounds containing terminal aromatic amino groups are obtained in this way.

According to German Offenlegungsschrift No. 2,546,536 and U.S. Pat. No. 3,865,791, relatively high molecular weight compounds containing terminal amino groups are obtained by reacting NCO prepolymers with enamines, aldimines or ketimines containing hydroxyl groups, followed by hydrolysis. Further processes for producing relatively high molecular weight compounds containing terminal amino groups or hydrazide groups are described in German Offenlegungsschrift No. 1,694,152 (U.S. Pat. No. 3,625,871).

According to the present invention, it is also possible to use polyhydroxyl compounds containing high molecular weight polyadducts and polycondensates or polymers in a finely dispersed or dissolved form. Polyhydroxyl compounds such as these are obtained, for example, by carrying out polyaddition reactions (for example, reactions between polyisocyanates and aminofunctional compounds) and polycondensation reactions (for example, between formaldehyde and phenols and/or amines) in situ in the above-mentioned compounds containing hydroxyl groups. Processes such as these are described, for example, in German Auslegeschriften Nos. 1,168,075 and 1,260,142 and in German Offenlegungsschriften Nos. 2,324,134, 2,423,984, 2,512,385, 2,513,815, 2,550,769, 2,550,797, 2,550,833, 2,550,862, 2,633,293 and 2,639,254.

It is also possible, in accordance with U.S. Pat. No. 3,869,413 or German Offenlegungsschrift No. 2,550,860, to mix an aqueous polymer dispersion with a polyhydroxyl compound and subsequently to remove the water from the mixture.

Polyhydroxyl compounds modified by vinyl polymers of the type obtained, for example, by polymerizing styrene and acrylonitrile in the presence of polyethers (U.S. Pat. Nos. 3,383,351, 3,304,273, 3,523,093 and 3,110,695; German Auslegeschrift No. 1,152,536) or polycarbonate polyols (German Pat. No. 1,769,795; U.S. Pat. No. 3,637,909) are also suitable for use in the process according to the present invention. Plastics having particularly good flameproof properties are obtained by using polyether polyols modified in accordance with German Offenlegungsschriften Nos. 2,442,101, 2,644,922 and 2,646,141 by graft polymerization with vinyl phosphonic acid esters and, optionally, (meth)acrylonitrile, (meth)acrylamide or OH-functional (meth)acrylic acid esters. Polyhydroxyl compounds into which carboxyl groups have been introduced by radical graft polymerization with unsaturated carboxylic acids and, optionally, other olefinically unsaturated monomers (German Offenlegungsschriften Nos. 2,714,291, 2,739,620 and 2,654,746) may be used with particular advantage in combination with mineral fillers.

Where modified polyhydroxyl compounds of the type mentioned above are used as a starting component in the polyisocyanate-polyaddition process, polyurethanes having considerably improved mechanical properties are formed in many cases.

Representatives of the above-mentioned compounds used in accordance with the present invention are described for example, in High Polymers, Vol. XVI, "Polyurethanes, Chemistry and Technology", by Saunders-Frisch, Interscience Publishers, New York/London, Vol. I, 1962, pages 32 to 42 and pages 44 to 54 and Vol. II, pages 5–6 and 198–199, and in Kunststoff-Handbuch, Vol. VII, Vieweg-Hochtlen, Carl-Hanser-Verlag, Munich, 1966, for example on pages 45 to 71. It is of course possible to use mixtures of the above-mentioned compounds containing at least two isocyanate-reactive hydrogen atoms and having a molecular weight of from 400 to 10,000, for example mixtures of polyethers and polyesters.

In some cases, it is particularly advantageous to combine low-melting and high-melting polyhydroxyl compounds with one another (German Offenlegungsschrift No. 2,706,297).

Additional optional starting components are compounds containing at least two isocyanate-reactive hydrogen atoms and having a molecular weight of from 32 to 400. In this case, too, the compounds in question are compounds containing hydroxyl groups and/or amino groups and/or thiol groups and/or carboxyl groups, preferably compounds containing hydroxyl groups and/or amino groups which serve as chain extenders or cross-linkers. These compounds generally contain from 2 to 8, preferably from 2 to 4 isocyanate-reactive hydrogen atoms.

In this case, too, it is possible to use mixtures of different compounds containing at least two isocyanate-reactive hydrogen atoms and having a molecular weight in the range of from 32 to 400.

Examples of compounds such as these are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxylmethyl cyclohexane, 2-methyl-1,3-propane diol, dibromobutene diol (U.S. Pat. No. 3,723,392), glycerol, trimethylol propane, 1,2,6-hexane triol, trimethylol ethane, pentaerythritol, quinitol, mannitol, sorbitol, castor oil, diethylene glycol, triethylene glycol, tetraethylene glycol, higher polyethylene glycols having a molecular weight of up to 400, dipropylene glycol, higher polypropylene glycols having a molecular weight of up to 400, dibutylene glycol, higher polybutylene glycols having a molecular weight of up to 400, 4,4'-dihydroxy diphenyl propane, dihydroxy methyl hydroquinone, ethanolamine, diethanolamine, N-methyl diethanolamine, triethanolamine and 3-aminopropanol.

Other low molecular weight polyols suitable for the purposes of the present invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschriften Nos. 2,639,084, 2,714,084, 2,714,104, 2,721,186, 2,738,154 and 2,738,512). In order to obtain plastics having improved fire resistance these formoses are advantageously used in combination with aminoplast formers and/or phosphites (German Offenlegungsschriften Nos. 2,738,513 and 2,738,532). Solutions of polyisocyanate polyaddition products, particularly solutions of polyurethane ureas containing ionic groups and/or solutions of polyhydrazodicarbonamides, in low molecular weight polyhydric alcohols may also be used as the polyol component in accordance with the present invention (German Offenlegungsschrift No. 2,638,759).

Aliphatic diamines suitable for use in accordance with the present invention are, for example ethylene diamine, 1,4-tetramethylene diamine, 1,11-undecamethylene diamine, 1,12-dodecamethylene diamine and mixtures thereof, 1-amino-3,3,5-trimethyl-5-aminomethyl cyclohexane ("isophorone diamine"), 2,4- and 2,6-hexahydrotolylene diamine and mixtures thereof, perhydro-2,4'- and -4,4'-diaminodiphenyl methane, p-xylylene diamines, bis-(3-aminopropyl)-methylamine diaminoperhydro anthracenes (German Offenlegungsschrift No. 2,638,731) and cycloaliphatic triamines according to German Offenlegungsschrift No. 2,614,244. It is also possible in accordance with the present invention to use hydrazine and substituted hydrazines, for example methyl hydrazine, N,N'-dimethyl hydrazine and their homologs and also acid dihydrazides, for example, carbodihydrazide, oxalic acid dihydrazide, the dihydrazides of malonic acid, succinic acid, glutaric acid, adipic acid, β-methyl adipic acid, sebacic acid, hydracrylic acid, and terephthalic acid; semicarbazido alkylene hydrazides such as β-semicarbazide propionic acid hydrazide (German Offenlegungsschrift No. 1,770,591), semicarbazido alkylene carbazinic esters such as 2-semicarbazido ethyl carbazinic ester (German Offenlegungsschrift No. 1,918,504) or even aminosemicarbazide compounds such as β-aminoethyl semicarbazido carbonate (German Offenlegungsschrift No. 1,902,931). To control their reactivity, the amino groups may be completely or partly blocked by aldimine or ketimine groups (U.S. Pat. No. 3,734,894; German Offenlegungsschrift No. 2,637,115).

Examples of aromatic diamines are bis-anthranilic acid esters according to German Offenlegungsschriften Nos. 2,040,644 and 2,160,590, 3,5- and 2,4-diaminobenzoic acid esters according to German Offenlegungsschrift No. 2,025,900, the diamines containing ester groups described in German Offenlegungsschriften Nos. 1,803,635 (U.S. Pat. Nos. 3,681,290 and 3,736,350), 2,040,650 and 2,160,589, the diamines containing ether groups according to German Offenlegungsschriften Nos. 1,770,525 and 1,809,172 (U.S. Pat. Nos. 3,654,364 and 3,736,295), 2-halogen-1,3-phenylene diamines optionally substituted in the 5-position (German Offenlegungsschriften Nos. 2,001,722, 2,025,896 and 2,065,869), 3,3'-dichloro-4,4'-diaminodiphenyl methane, tolylene diamines, 4,4'-diaminodiphenyl methane, 4,4'-diaminodiphenyl disulfides (German Offenlegungsschrift No. 2,404,976), diaminodiphenyl dithio ethers (German Offenlegungsschrift No. 2,509,404), aromatic diamines substituted by alkyl thio groups (German Offenlegungsschrift No. 2,638,760), diaminobenzene phosphonic acid esters (German Offenlegungsschrift No. 2,459,491), aromatic diamines containing sulfonate or carboxylate groups (German Offenlegungsschrift No. 2,720,166) and the high-melting diamines described in German Offenlegungsschrift No. 2,635,400. Examples of aliphatic-aromatic diamines are the aminoalkyl thioanilines according to German Offenlengungsschrift No. 2,734,574.

According to the present invention, other suitable chain extenders are compounds such as 1-mercapto-3-amino-propane, optionally substituted amino acids, for example, glycine, alanine, valine, serine and lysine and optionally substituted dicarboxylic acids for example, succinic acid, adipic acid, phthalic acid, 4-hydroxy phthalic acid and 4-amino-phthalic acid.

In addition, isocyanate-monofunctional compounds may be used as so-called chain terminators in proportions of from 0.01 to 10% by weight, based on the polyurethane solids. Monofunctional compounds such as these are, for example, monoamines, such as butyl and dibutylamine, octylamine, stearylamines, N-methyl stearylamine, pyrrolidine, piperidine and cyclohexylamine, monoalcohols such as butanol, 2-ethyl hexanol, octanol, dodecanol, the various amyl alcohols, cyclohexanol and ethylene glycol monoethyl ether.

Other low molecular weight polyols having a molecular weight of up to 400 which may be used in accordance with the present invention are ester diols corresponding to the following general formulae:

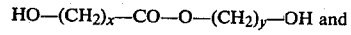

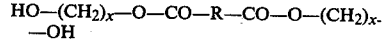

wherein
R represents an alkylene radical containing from 1 to 10, preferably from 2 to 6 carbon atoms or a cycloalkylene or arylene radical containing from 6 to 10 carbon atoms,
$x = 2$ to 6 and
$y = 3$ to 5,
for example δ-hydroxybutyl-ε-hydroxycaproic acid ester, ω-hydroxyl-hexyl-γ-hydroxyl butyric acid ester, adipic acid-bis-(β-hydroxyethyl)-ester and terephthalic acid-bis-(β-hydroxyethyl)-ester. Other suitable low molecular weight polyols are the diol urethanes corresponding to the following general formula:

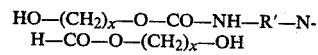

wherein
R' represents an alkylene radical containing from 2 to 15 carbon atoms, preferably from 2 to 6 carbon atoms or a cycloalkylene or arylene radical containing from 6 to 15 carbon atoms, and
x represents a number of from 2 to 6, for example 1,6-hexamethylene-bis-(β-hydroxyethyl urethane) or 4,4'-diphenyl methane-bis-(δ-hydroxybutyl urethane) and diol ureas corresponding to the following general formula:

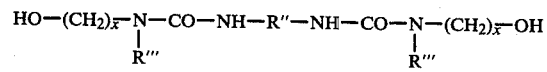

wherein
R'' represents an alkylene radical containing from 2 to 15 carbon atoms preferably from 2 to 9 carbon atoms or a cycloalkylene or arylene radical containing from 6 to 15 carbon atoms,
R''' represents hydrogen or a methyl group and
x represents the number 2 or 3,
for example 4,4'-diphenyl methane-bis-(β-hydroxyethyl-urea) or the compound

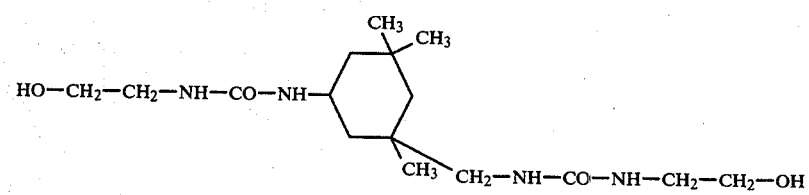

For certain purposes, it is advantageous to use polyols containing sulfonate and/or phosphate groups (German Offenlegungsschrift No. 2,719,372), preferably the adduct of bisulfite with 1,4-butene diol or its alkoxylation products.

As optional additives and auxiliaries:

(a) Water and/or readily volatile inorganic or organic substances as blowing agents. Organic blowing agents are, for example, acetone, ethylacetate, halogen-substituted alkanes, such as methylene chloride, monofluorotrichloromethane, chlorodifluoromethane, dichlorodifluoromethane, also butane, hexane, heptane or diethyl ether. Inorganic blowing agents are, for example, air, $CO_2$ or $N_2O$. A blowing effect may also be obtained by adding compounds which decompose at temperature giving off gases, such as nitrogen, for example, azo compounds such as azodicarbonamide or azoisobutyronitrile. Other examples of blowing agents and information on the use of blowing agents can be found in Kunststoff-Handbuch, Vol. VII, by Vieweg and Hochtlen, Carl-Hanser-Verlag, Munich 1966, for example on pages 108 and 109, 453 to 455 and 507 to 510.

(b) Catalysts known per se, for example tertiary amines, such as triethylamine, tributylamine, N-methyl morpholine, N-ethyl morpholine, 1,4-diazabicyclo-(2,2,2)-octane, N-methyl-N'-dimethylaminoethyl piperidine, bis-(dimethylaminoalkyl)-piperazines (German Offenlegungsschrift No. 2,636,787), N,N-dimethyl benzylamine, N,N-dimethyl cyclohexamine, N,N-diethyl benzylamine bis-(N,N-diethylaminoethyl)-adipate, N,N-dimethyl-$\beta$-phenyl ethylamine, 1,2-dimethyl imidazole, 2-methyl imidazole, monocyclic and bicyclic amidines (German Offenlegungsschrift No. 1,720,633), bis-(dialkylamino-alkyl) ethers (U.S. Pat. No. 3,330,782, German Auslegeschrift No. 1,030,558, German Offenlegungsschriften Nos. 1,804,361 and 2,618,280) and tertiary amines containing amide groups (preferably formamide groups) according to German Offenlegungsschriften Nos. 2,523,633 and 2,732,292. Suitable catalysts also include known Mannich bases of secondary amines, such as dimethylamine, and aldehydes, preferably formaldehyde, or ketones, such as acetone, methylethyl ketone or cyclohexanone, and phenols, such as phenol, nonyl phenol or bisphenol.

Tertiary amines containing isocyanate-reactive hydrogen atoms suitable for use as catalysts are, for example, triethanolamine, triisopropanolamine, N-methyl diethanolamine, N-ethyl diethanolamine, N,N-dimethyl ethanolamine, their reaction products with alkylene oxides, such as propylene oxide and/or ethylene oxide and also secondary-tertiary amines according to German Offenlegungsschrift No. 2,732,292.

Still other suitable catalysts are the silaamines containing carbon-silicon bonds, of the type described, for example, in German Pat. No. 1,229,290 (corresponding to U.S. Pat. No. 3,620,984), for example 2,2,4-trimethyl-2-silamorpholine and 1,3-diethylaminomethyl tetramethyl disiloxane.

Other suitable catalysts are nitrogen-containing bases, such as tetraalkyl ammonium hydroxides, also alkali metal hydroxides such as sodium hydroxide, alkali metal phenolates, such as sodium phenolate, or alkali metal alcoholates, such as sodium methylate. In addition, hexahydrotriazines may also be used as catalyst (German Offenlegungsschrift No. 1,769,043).

The reaction between NCO-groups and Zerewitinoff-active hydrogen atoms is also greatly accelerated by lactams and azalactams, an associate between the lactam and the compound containing acid hydrogen initially being formed. Associates such as these and their catalytic effect are described in German Offenlegungsschriften Nos. 2,062,288, 2,062,289, 2,117,576 (U.S. Pat. Nos. 3,758,444), 2,129,198, 2,330,175 and 2,330,211.

According to the present invention, it is also possible to use organometallic compounds, particularly organotin compounds, as catalysts. In addition to sulfur-containing compounds, such as di-n-octyl tin mercaptide (German Auslegeschrift No. 1,769,367; U.S. Pat. No. 3,654,927), preferred organo tin compounds are tin (II) acetate, tin(II) octoate, tin(II)ethyl hexoate and tin (II) laurate and tin (IV) compounds, for example dibutyl tin oxide, dibutyl tin dichloride, dibutyl tin diacetate, dibutyl tin dilaurate, dibutyl tin maleate or dioctyl tin oxide, dibutyl tin dichloride, dibutyl tin diacetate, dibutyl tin dilaurate, dibutyl tin maleate or dioctyl tin diacetate.

All the above-mentioned catalysts may of course be used in the form of mixtures. In this respect, combinations of organometallic compounds and amidines, aminopyridines or hydrazino pyridines (German Offenlegungsschriften Nos. 2,434,185, 2,601,082 and 2,603,834) are of particular interest.

Further representatives of catalysts suitable for use in accordance with the present invention and information on the way in which they work can be found in Kunststoff-Handbuch by Vieweg and Hochtlen, Vol. VII, Carl-Hanser-Verlag, Munich 1966, for example on pages 96 to 102.

The catalysts are generally used in a quantity of from about 0.001% to 10% by weight, based on the total quantity of compounds containing at least two isocyanate-reactive hydrogen atoms.

(c) Surface additives, such as emulsifiers and foam stabilizers. Suitable emulsifiers are, for example, the sodium salts of castor oil sulfonates or salts of fatty acids with amines, such as dodecyl benzene sulfonic acid, dinaphthyl methane disulfonic acid or of fatty acids such as ricinoleic acid, or of polymeric fatty acids may also be used as surface-active additives.

Suitable foam stabilizers are, above all, polyether siloxanes, particularly water soluble types. The structure of these compounds is generally such that a copolymer of ethylene oxide and propylene oxide is attached to a polydimethyl siloxane residue. Foam stabilizers such as these are described, for example, in U.S. Pat. Nos. 2,834,748, 2,917,480, and 3,629,308. In many cases, polysiloxanepolyoxyalkylene copolymers branched through allophanate groups according to German Offenlegungsschrift 2,558,523 are of particular interest.

(d) Reaction retarders, for example acid-reacting substances such as hydrochloric acid or organic acid halides, and cell regulators known as per se, such as paraffins or fatty alcohols or dimethyl polysiloxanes and also pigments or dyes and flameproofing agents known as per se, for example tris-chloroethyl phosphate, tricresyl phosphate or ammonium phosphate and polyphosphate, also stabilizers against the effects of aging and weather, plasticizers and fungistatic and bacteriostatic substances as well as fillers such as barium sulfate, kieselguhr, carbon black or whiting.

Further examples of surface-active additives and foam stabilizers, cell regulators, reaction retarders, stabilizers, flameproofing agents, plasticizers, dyes, fillers, fungistatic and bacteriostatic substances which may optionally be used in accordance with the present invention and information on the way in which these additives are used and on their respective modes of action can be found in Kunststoff-Handbuch by Vieweg and Hochtlen, Vol. VII, Carl-Hanser-Verlag, Munich 1966, for example on pages 103 to 113.

According to the present invention, it is possible to use any blowing and cross-linking catalysts which correspond to the above general formulae.

The catalysts and catalyst combinations according to the present invention which are mentioned in the Examples are the following products ((B)=blowing catalyst, (C)=cross-linking catalyst):

(I) N,N,N',N'-tetramethyl hexamethylene diamine (C)

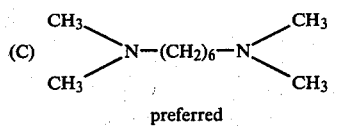

preferred (II) N,N,N'N'-tetramethyl-2,2'-diaminodiethyl ether (B)

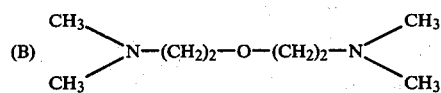

(III) N,N,N',N'',N''-pentamethyl diethylene triamine (B)

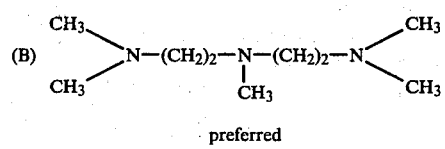

preferred (IV) N,N,N',N''N''',N'''',N''''-heptamethyl tetraethylene pentamine (B)

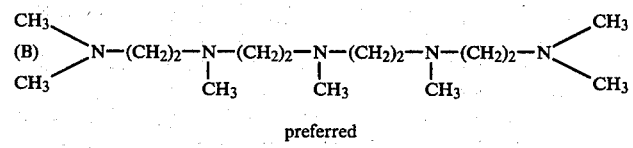

preferred (V) dimethyl cyclohexylamine (does not correspond to the present invention)

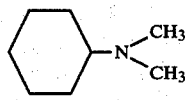

(VI) 1-methylimidazole (does not correspond to the present invention)

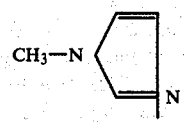

(VII) triethylene diamine (does not correspond to the present invention)

(VIII) N,N,N',N'-tetramethyl-2,5-diamino-2,5-dimethylhexane (C)

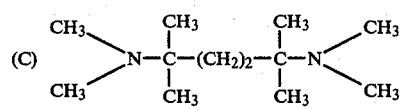

(IX) N,N,N',N'-tetramethyl-2,2,4-trimethyl hexamethylene diamine (C)

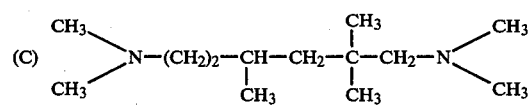

(X) N,N'-dimethyl-N,N'-diisopropyl hexamehtylene diamine

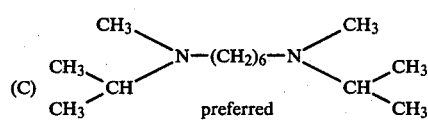

preferred

The process according to the present invention is carried out in the following manner. According to the present invention, the reaction components are reacted by the one-shot process known per se, by the prepolymer process or by the semiprepolymer process. In many cases these processes are carried out using machines, of the type for example described in U.S. Pat. No. 2,764,565. Particulars about other processing machines which may also be used in accordance with the present invention can be found in Kunststoff-Handbuch, by Vieweg and Hochtlen, Vol. VII, Carl-Hanser-Verlag, Munich 1966, for example on pages 121 to 205.

In the production of foams, it is also possible with the present invention to carry out foaming in closed molds. To this end, the reaction mixture is introduced into a mold. Suitable mold materials are metals, (for example aluminum), or plastics, (for example epoxide resin). The foamable reaction mixture foams inside the mold and forms the molding. In-mold foaming may be carried out in such a way that the molding has a cellular structure at its surface, or it may also be carried out in such a way that the molding has a compact skin and a cellular core. It is possible with the present invention to introduce foamable reaction mixture into the mold in such a quantity that the foam formed just fills the mold. It is also possible however, to introduce into the mold more foamable reaction mixture than is required for filling the interior of the mold with foam. This particular technique, known as overcharging, is known, for example, from U.S. Pat. Nos. 3,178,490 and 3,182,104.

In many cases, "external release agents" known per se, such as silicone oils, are used for the preferred in-mold foaming. It is also possible, however, to use so-called "internal release agents", optionally in admixture with external release agents of the type known, for example, from German Offenlegungsschriften Nos. 2,121,670 and 2,307,589.

According to the present invention, it is also possible to produce cold-hardening foams (cf. British Pat. No. 1,162,517 and German Offenlegungsschrift No. 2,153,086).

It is of course also possible to produce foams by blocked foaming or by the laminator process known per se.

The products obtainable in accordance with the present invention may be used, for example, in car seats, armrests, structural components, mattresses, refrigerators, coldstore insulations, roof insulations, insulating panels for the building industry and structural panels (sandwich panels).

The following examples serve to illustrate the invention without restricting it in any way. In the examples all quantities quoted represent parts by weight or percent by weight, unless otherwise indicated.

EXAMPLES

Example 1

95 g of a polyether polyol having a hydroxyl number of 425, obtained by the addition of propylene oxide with a mixture of sucrose, propylene glycol and water, 1.5 g of water, 1.5 g of a foam stabilizer according to German Offenlegungsschrift No. 2,029,293, 0.5 g of N,N,N',N'-tetramethyl-2,2'-diaminodiethyl ether, catalyst (II), 1.6 g of N,N,N',N'-tetramethyl hexamethylene diamine, catalyst (I) and 38 g of a fluorochlorinated hydrocarbon as a blowing agent are mixed.

This mixture is thoroughly mixed under identical conditions with 133 g of crude 4,4'-diisocyanatodiphenyl methane, which has been obtained by phosgenating an aniline-formaldehyde condensate and which has an NCO-content of 31%, in a high-pressure spray-mixing head and introduced into one of the following molds:

1. A paper (test) packet measuring 20×20×14 cm for assessing the cream and gel times, the free gross density and surface brittleness after hardening of the foam.

2. A board mold consisting of an upright hollow body measuring 200×20×5 cm heated to 35° C. It is lined with paper and, from the upper end, has four venting holes 5 mm in diameter. The mixture is introduced 35 cm above the lower end so that the foam in the process of formation can ascend vertically. The foam boards obtained are assessed for shot weight, flow level, mean gross density, gross density distribution, compressive strength, cell size, cell structure and surface voids.

3. A panel mold measuring 100×100×6 cm in which sandwich panels are foamed having 1 mm thick sheet steel surface layers for determining the minimum in-mold time. The minimum in-mold time is understood to be the period for which the panel has to remain in a preheated mold in order not to show any signs of thickness expansion 30 minutes after mold release. The measured data provide for an overall assessment of the activator or combination of activators. The results obtained are set out in Table 1 together with Comparison Examples 4 to 11. The assessment of surface brittleness, cell size, cell structure and the overall assessment were based on the following numerical code:

Surface brittleness
Mark 1 = surface is not brittle
Mark 2 = surface is only brittle for a period of 15 minutes
Mark 3 = surface is brittle for a period of from 15 to 60 minutes
Mark 4 = surface remains brittle for more than 60 minutes.
Surface voids
Mark 1 = no surface voids
Mark 2 = small surface voids
Mark 3 = medium surface voids
Mark 4 = large surface voids
Cell size
Mark 1 = very fine/spherical
Mark 2 = fine
Mark 3 = medium-fine
Mark 4 = coarse
Cell structure
Mark 1 = very regular
Mark 2 = regular
Mark 3 = irregular
Overall assessment
Mark 1 = very good
Mark 2 = good
Mark 3 = satisfactory to adequate
Mark 4 = inadequate.
The results are set out in Table 1.

Example 2

95 g of the polyether polyol according to Example 1 (hydroxyl number 425), 1.5 g of water, 1.5 g of a foam stabilizer according to German Offenlegungsschrift No. 2,029,293, 0.5 g of N,N,N',N'',N'''-pentamethyl diethylene triamine, catalyst (III), 1.4 g of N,N,N',N'-tetramethylene hexamethylene diamine, catalyst (I), and 38 g of a fluorochlorinated hydrocarbon as a blowing agent are mixed.

This mixture is foamed with 133 g of crude 4,4'-diisocyanatodiphenyl methane under the conditions described in Example 1. The resulting foams are tested and assessed in the same way as described in Example 1. The data set out in Table 1 illustrate the superiority of the activator combination according to the present invention.

Example 3

95 g of the polyether polyol according to Example 1 (hydroxyl number 425), 1.5 g of water, 1.5 g of a foam stabilizer according to German Offenlegungsschrift No. 2,029,293, 0.5 g of N,N,N',N',N'',N''', N'''',N''''-heptamethyl tetraethylene pentamine, catalyst (IV), 1.7 g of N,N,N',N'-tetramethyl hexamethylene diamine, catalyst (I) and 38 g of a fluorochlorinated hydrocarbon as a blowing agent are mixed.

This mixture is foamed with 133 g of crude 4,4'-diisocyanatodiphenyl methane under the conditions described in Example 1. The resulting foams are tested and assessed in the same way as described in Example 1. The data set out in Table 1 illustrates the superiority of the activator combination according to the present invention.

Example 4

95 g of the polyether polyol according to Example 1 (hydroxyl number 425), 1.5 g of water, 1.5 g of a foam stabilizer according to German Offenlegungsschrift No. 2,029,293, 0.5 g of N,N,N',N",N"',-pentamethyl diethylene triamine, catalyst (III), 1.5 g of N,N,N',N'-tetramethyl-2,5-diamino-2,5-dimethyl hexane, catalyst (VIII) and 38 g of a fluorochlorinated hydrocarbon as a blowing agent are mixed.

This mixture is foamed with 133 g of crude 4,4'-diisocyanatodiphenyl methane under the conditions described in Example 1. The resulting foams are tested and assessed in the same way as described in Example 1.

The data set out in Table 1 illustrate the superiority of the activator combination according to the present invention.

Example 5

95 g of the polyether polyol according to Example 1 (hydroxyl number 425), 1.5 g of water, 1.5 g of a foam stabilizer according to German Offenlegungsschrift No. 2,029,293, 0.5 g of N,N,N',N",N"',-pentamethyl diethylene triamine, catalyst (III), 2.4 g of N,N,N',N'-tetramethyl-2,2,4,-tri-methyl-1,6-hexamethylene diamine, catalyst (IX) and 38 g of a fluorochlorinated hydrocarbon as a blowing agent are mixed.

The resulting mixture is foamed with 133 g of crude 4,4'-diisocyanatodiphenyl methane under the conditions described in Example 1. The resulting foams are tested and assessed in the same way as described in Example 1. The data set out in Table 1 illustrate the superiority of the activator combination according to the present invention.

Example 6

(Comparison Example)

95 g of the polyether polyol according to Example 1 (hydroxyl number 425), 1.5 g of water, 1.5 g of a foam stabilizer according to German Offenlegungsschrift No. 2,029,293, 0.5 g of N,N,N',N",N"'-pentamethyl diethylene triamine, catalyst (III), 2.0 g of dimethyl cyclohexylamine, catalyst (V) and 38 g of a fluorochlorinated hydrocarbon as a blowing agent are mixed.

The resulting mixture is foamed with 133 g of crude 4,4'-diisocyanatodiphenyl methane under the same conditions as described in Example 1. The resulting foams are tested and assessed in the same way as described in Example 1. In comparison with Examples 1 to 3, the data set out in Table 1 illustrate the superiority of the activator combinations according to the present invention. The poor gross density distribution and the long in-mold time are particularly unfavorable.

Example 7

(Comparison Example)

95 g of the polyether polyol according to Example 1 (hydroxyl number 425), 1.5 g of water, 1.5 g of a foam stabilizer according to German Offenlegungsschrift No. 2,029,293, 2.9 g of dimethyl cyclohexylamine, catalyst V, and 28 g of a fluorochlorinated hydrocarbon as a blowing agent are mixed.

The resulting mixture is foamed with 133 g of crude 4,4'-diisocyanatodiphenyl methane under the conditions described in Example 1. The resulting foams are tested and assessed in the same way as in Example 1. In comparison with Examples 1 to 3, the data set out in Table 1 demonstrate the superiority of the activator combinations according to the present invention. The strong odor given off, even from freshly hardened systems, and the reduced flow are particularly unfavorable.

Example 8

(Comparison Example)

95 g of the polyether polyol according to Example 1 (hydroxyl number 425), 1.5 g of water, 1.5 g of a foam stabilizer according to German Offenlegungsschrift No. 2,029,293, 3.0 g of 1-methyl imidazole, catalyst (VI) and 38 g of a fluorochlorinated hydrocarbon as a blowing agent are mixed.

The resulting mixture is foamed with 133 g of crude 4,4'-diisocyanatodiphenyl methane under the conditions described in Example 1. The resulting foams are tested and assessed in the same way as described in Example 1. In comparison with Examples 1 to 3, the data set out in Table 1 illustrate the superiority of the activator combinations according to the present invention. The coarse cells, the poor flow and the long in-mold time are particularly unfavorable.

Example 9

(Comparison Example)

95 g of the polyether polyol according to Example 1 (hydroxyl number 425), 1.5 g of water, 1.5 g of a foam stabilizer according to German Offenlegungsschrift No. 2,029,293, 0.5 g of N,N,N',N"-pentamethyl diethylene triamine, catalyst (III), 1.5 g of 1-methyl imidazole, catalyst (VI) and 38 g of a fluorochlorinated hydrocarbon as blowing agent are mixed.

The resulting mixture is foamed with 133 g of crude 4,4'-diisocyanatodiphenyl methane under the conditions described in Example 1. The resulting foams are tested and assessed in the same way as described in Example 1. In comparison with Examples 1 to 3, the data set out in Table 1 reflect the superiority of the activator combinations according to the present invention. The reduced flow and the long in-mold time are particularly unfavorable.

Example 10

(Comparison Example)

95 gram of the polyether polyol according to Example 1 (hydroxyl number 425), 1.5 g of water, 1.5 g of a foam stabilizer according to German Offenlegungsschrift No. 2,029,293, 2.3 g N,N,N',N",N"',N"",N""'-heptamethyltetraethylene pentamine (IV) and 38 g of a fluorochlorinated hydrocarbon as a blowing agent are mixed in. The resulting mixture is foamed with 133 g of crude 4,4'-diisocyanatodiphenylmethane under the conditions described in Example 1. The resulting foams are tested and assessed in the same way as described in Example 1. In comparison with Examples 1 to 3, the data set out in Table I demonstrates the superiority of the activator combinations according to the present invention. The extreme brittleness of the foam is particularly unfavorable.

Example 11

(Comparison Example)

95 g of the polyether polyol according to Example 1 (hydroxyl number 425), 1.5 g of water, 1.5 g of a foam stabilizer according to German Offenlegungsschrift No. 2,029,293, 0.2 of triethylene diamines, catalyst (VII), 1.8 g of N,N,N',N'-tetramethyl-hexamethylene diamine, catalyst (I), and 38 g of a fluorochlorinated hydrocarbon as a blowing agent are mixed.

The resulting mixture is foamed with 133 g of crude 4,4'-diisocyanatodiphenyl methane under the conditions described in Example 1. The resulting foams are tested and assessed in the same way as described in Example 1. In comparison with Examples 1 to 3, the data set out in Table 1 demonstrate the superiority of the activator combinations according to the present invention. The large cells and the reduced flow are particularly unfavorable.

Example 12
(Comparison Example)

95 g of the polyether polyol according to Example 1 (hydroxyl number 425), 1.5 g of water, 1.5 g of a foam stabilizer according to German Offenlegungsschrift No. 2,029,293, 0.9 g of triethylene diamine, catalyst (VII) and 38 g of a fluorochlorinated hydrocarbon as a blowing agent are mixed.

The resulting mixture is foamed with 133 g crude 4,4'-diisocyanatodiphenyl methane under the conditions described in Example 1. The resulting foams are tested and assessed in the same way as described in Example 1. In comparison with Examples 1 to 3, the data set out in Table 1 reflect the superiority of the activator combinations according to the present invention. The very low flow is particularly unfavorable.

Example 13
(Comparison Example)

95 g of the polyether polyol of Example 1 (hydroxyl number 425), 1.5 g of water, 1.5 g of a foam stabilizer according to German Offenlegungsschrift No. 2,029,293, 2.3 g of N,N,N',N'-tetramethyl hexamethylene diamine, catalyst (I) and 38 g of a fluorochlorinated hydrocarbon as a flowing agent are mixed.

The resulting mixture is foamed with 133 g of crude 4,4'-diisocyanatodiphenyl methane under the conditions described in Example 1. The resulting foams are tested and assessed in the same way as described in Example 1. In comparison with Examples 1 to 3, the data set out in Table 1 demonstrate the superiority of the activator combinations according to the present invention. The low flow is particularly unfavorable.

Example 14
(Comparison Example)

95 g of the polyether polyol according to Example 1 (hydroxyl number 425), 1.5 g of water, 1.5 g of a foam stabilizer according to German Offenlegungsschrift No. 2,029,293, 1.8 g of N,N,N',N'',N''-pentamethyl diethylene triamine, catalyst (III) and 38 g of a fluorochlorinated hydrocarbon as a blowing agent are mixed.

The resulting mixture is foamed with 133 g crude 4,4'-diisocyanatodiphenyl methane under the conditions described in Example 1. The resulting foams are tested and assessed in the same way as described in Example 1. In comparison with Examples 1 to 3, the data set out in Table 1 reflect the superiority of the activator combinations according to the present invention. The extreme brittleness of the foam is particularly unfavorable.

TABLE 1

| Example No. | Activator combinations according to the present invention | | | | | Comparison Examples | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Activator Combination | I/II | II/III | I/IV | VIII/III | IX/III | III/V | V | VI | III/VI | IV | VII/I | VII | I | III |
| 1. Test packet | | | | | | | | | | | | | | |
| Cream time (seconds) | 13 | 12 | 16 | 9 | 10 | 11 | 18 | 33 | 13 | 8 | 23 | 25 | 21 | 7 |
| Gel time (seconds) | 100 | 100 | 100 | 100 | 100 | 100 | 100 | 100 | 100 | 100 | 100 | 100 | 100 | 100 |
| Free gross density (kg/m$^3$) | 20.9 | 21.6 | 22.2 | 21.5 | 21.3 | 21.4 | 21.5 | 23.4 | 20.8 | 21.7 | 22.2 | 23.4 | 21.4 | 23.0 |
| Surface brittleness | 1 | 1 | 1 | 1 | 1 | 2 | 1 | 1 | 1 | 4 | 1 | 1 | 1 | 4 |
| 2. Board Mold | | | | | | | | | | | | | | |
| Shot weight (g) | 580 | 580 | 580 | 580 | 580 | 580 | 580 | 580 | 580 | 580 | 580 | 580 | 580 | 580 |
| Flow level (cm) | 200 | 200 | 200 | 200 | 200 | 197 | 193 | 152 | 188 | 200 | 185 | 166 | 178 | 200 |
| Gross density (kg/m$^3$) | 29 | 29 | 29 | 29 | 29 | 29.4 | 30 | 38.2 | 30.9 | 29 | 31.4 | 34.9 | 32.6 | 29 |
| Gross-density distribution (kg/m$^3$) | 29 ± 1 | 29 ± 1 | 29 ± 1 | 29 ± 1 | 29 ± 1 | 27 ± 3 | 28 ± 2 | 34 ± 6 | 28 ± 3 | 27 ± 4 | 29 ± 3 | 30 ± 5 | 29 ± 4 | 27 ± 3 |
| Compressive strength (MPa) | 0.14 | 0.15 | 0.14 | 0.13 | 0.14 | 0.13 | 0.11 | 0.08 | 0.10 | 0.12 | 0.09 | 0.07 | 0.09 | 0.012 |
| Cell size | 1 | 1 | 1 | 1 | 1 | 1 | 2 | 4 | 2 | 1 | 3 | 3 | 2 | 1 |
| Cell structure | 1 | 1 | 1 | 1 | 1 | 2 | 2 | 2 | 2 | 3 | 2 | 2 | 1 | 3 |
| Surface Voids | 1 | 1 | 1 | 1 | 1 | 2 | 2 | 4 | 3 | 2 | 2 | 2 | 2 | 2 |
| 3. Panel Mold | | | | | | | | | | | | | | |
| Minimum in-mold time (Mins) | 4 | 4 | 4 | 3.5 | 3.5 | 5 | 4.5 | 6 | 5 | 4.5 | 5 | 5 | 4.5 | 5 |
| Overall assessment | 1 | 1 | 1 | 1 | 1 | 3 | 2 | 4 | 4 | 3-4 | 3 | 4 | 3 | 3-4 |

What is claimed is:

1. A process for the production of polyurethane plastics by reacting: (a) compounds containing at least two isocyanate-reactive hydrogen atoms and having a molecular weight of from 400 to 10,000, (b) polyisocyanates and, optionally, (c) chain extenders having a molecular weight in the range of from 32 to 400, foam stabilizers, water and/or organic blowing agents, wherein the improvement is in using a catalytic amount of combination catalysts containing tertiary nitrogen, said combinations comprising, (1) cross-linking catalysts corresponding to the following general formula:

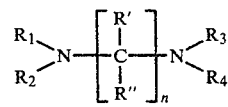

wherein

R₁, R₂, R₃ and R₄, which may be the same or different, represent C₁-C₅-alkyl radicals, R' and R" represent hydrogen or the same or different C₁-C₃-alkyl radicals, and n represents an integer of from 1 to 10, preferably from 4 to 8, and (2) blowing catalysts corresponding to the following general formula:

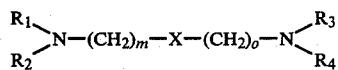

wherein

R₁, R₂, R₃ and R₄, are as defined above and

X represents oxygen or

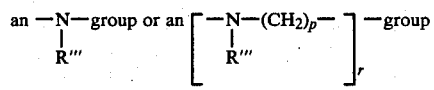

where

R''' represents a C₁-C₅-alkyl radical, p represents an integer of from 2 to 4, r represents an integer of from 1 to 3, and m and o, which may be the same or different, represent integers ranging from 1 to 10 in value.

2. A process as claimed in claim 1, wherein R₁, R₂, R₃, R₄, R', and R" and R''', which may be the same or different represent CH₃— or C₂H₅— radicals.

3. A process as claimed in claim 1, wherein n represents an integer of from 4 to 8.

4. A process as claimed in claim 1, wherein m and o represent integers of from 1 to 3.

5. A process as claimed in claim 1, wherein catalyst combinations of from 0.1 to 3.0 parts by weight of the blowing catalysts with from 0.3 to 5.0 parts by weight of the cross-linking catalysts are used per 100 parts by weight of said component (a).

6. A process as claimed in claim 1, wherein catalyst combinations of from 0.3 to 1.0 parts by weight of the blowing catalysts with from 1.0 to 3.0 parts by weight of the cross-linking catalysts are used per 100 parts by weight of said component (a).

7. A process as claimed in claims 1 or 6, wherein a compound corresponding to

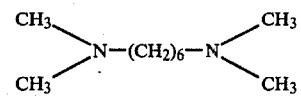

in said cross-linking catalyst, and a compound corresponding to

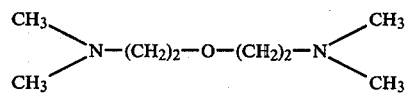

in said blowing catalyst.

8. A process as claimed in claims 1 or 6, wherein a compound corresponding to

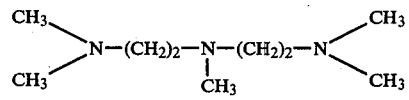

is used as said blowing catalyst.

9. A process as claimed in claims 1 or 6, wherein a compound corresponding to

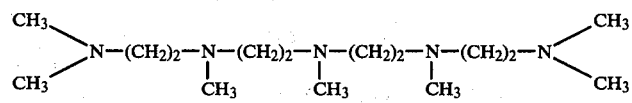

is used as said blowing catalyst.

10. A process as claimed in claim 1, wherein polyurethane plastics foamed within molds are produced.

11. A process as claimed in claim 1 or 6 wherein a compound corresponding to

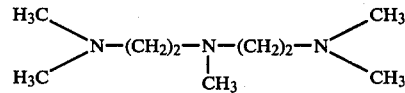

or

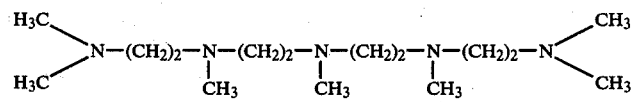

is used as said blowing catalyst; and a compound corresponding to

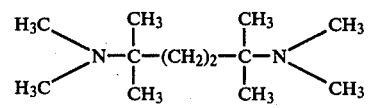

is used as said cross-linking catalyst.

12. A process as claimed in claims 1 or 6, wherein a compound corresponding to

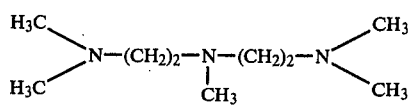
or
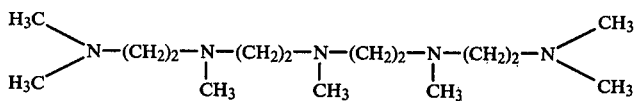
is used as said blowing catalyst and a compound corresponding to
13. A process as claimed in claim 1 or 6, wherein a compound corresponding to
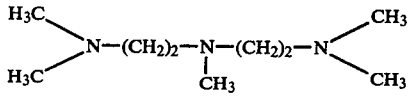
or
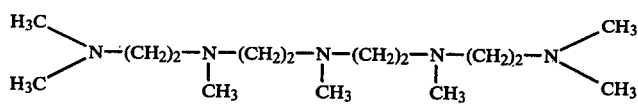
is used as said blowing catalyst; and wherein a compound corresponding to
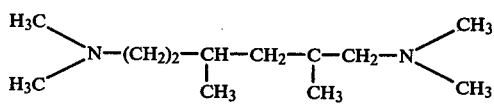
is used as said cross-linking catalyst.
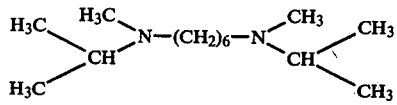
is used as said cross-linking catalyst.
* * * * *